United States Patent
Gausrab et al.

(10) Patent No.: US 9,435,313 B2
(45) Date of Patent: Sep. 6, 2016

(54) STARTER ARRANGEMENT

(71) Applicant: Dr. Ing. h.c. F. Porsche Aktiengesellschaft, Stuttgart (DE)

(72) Inventors: Klaus Gausrab, Tiefenbronn (DE); Hannes Christian Bartz, Vaihingen/Enz (DE); Jochen Pflüger, Weissach (DE); Ronny Brodersen, Sachsenheim (DE); Werner Seider, Mönsheim (DE); Klaus Peter Krüger, Oberriexingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 131 days.

(21) Appl. No.: 14/497,880

(22) Filed: Sep. 26, 2014

(65) Prior Publication Data

US 2015/0090213 A1    Apr. 2, 2015

(30) Foreign Application Priority Data

Sep. 27, 2013  (DE) ................. 10 2013 110 724

(51) Int. Cl.
*F02N 15/02* (2006.01)
*F02N 11/14* (2006.01)
(Continued)

(52) U.S. Cl.
CPC ............ *F02N 15/022* (2013.01); *F02N 11/14* (2013.01); *F02N 15/006* (2013.01); *B60K 6/405* (2013.01); *F02N 15/067* (2013.01); *F16H 57/00* (2013.01); *Y10S 903/905* (2013.01)

(58) Field of Classification Search
CPC ...... F02N 15/006; F02N 15/06; F02N 11/00; F02N 11/14; F02N 15/063; F02N 19/001; F02N 2015/061; F02N 15/022; F02N 15/067; B60K 6/405; F16H 57/00
See application file for complete search history.

(56) References Cited

U.S. PATENT DOCUMENTS

| 4,646,902 A | 3/1987 | Maruyamano |
| 5,855,139 A | 1/1999 | Ohmi et al. |

(Continued)

FOREIGN PATENT DOCUMENTS

| DE | 102013201200 | 8/2013 |
| JP | 0519617 | 5/1993 |

(Continued)

OTHER PUBLICATIONS

Japanese Office Action mailed Sep. 8, 2015 for Japanese Application No. 2014-198025, including English translation.

(Continued)

*Primary Examiner* — Hung Q Nguyen
*Assistant Examiner* — Tea Holbrook
(74) *Attorney, Agent, or Firm* — RatnerPrestia

(57) ABSTRACT

A starter arrangement for starting a motor vehicle engine, having a starter ring for connecting to a drive shaft, a starter unit for introducing a starter torque into the starter ring via a starter pinion acting on the starter ring, and a clutch connected to the starter ring for coupling the drive shaft to at least one transmission input shaft of a transmission. The clutch is spaced apart in the axial direction from the starter ring by an axial distance s, a forming reserved installation space for positioning an electric machine for a hybrid drive. The starter unit is positioned at least partially, preferably in large part, within the reserved installation space. A smaller installation space requirement for positioning a drive train in a motor vehicle body is possible by the sharing of the reserved installation space provided for the electric machine.

16 Claims, 2 Drawing Sheets

(51) Int. Cl.
   *F02N 15/00*   (2006.01)
   *B60K 6/405*   (2007.10)
   *F02N 15/06*   (2006.01)
   *F16H 57/00*   (2012.01)

(56) References Cited

U.S. PATENT DOCUMENTS

| 6,199,529 | B1* | 3/2001 | Kuwabara | F02B 63/02 |
| | | | | 123/179.24 |
| 6,311,495 | B1 | 11/2001 | Shimizu | |
| 2009/0183595 | A1* | 7/2009 | Niimi | F02N 15/067 |
| | | | | 74/7 R |
| 2010/0024757 | A1 | 2/2010 | Kashiwabara | |
| 2013/0192947 | A1 | 8/2013 | Frait | |

FOREIGN PATENT DOCUMENTS

| JP | 08270533 | 10/1996 |
| JP | 09193676 | 7/1997 |
| JP | 11178555 | 3/1999 |
| JP | 2001071767 | 3/2001 |
| JP | 2002235639 | 8/2002 |
| JP | 2008215343 | 9/2008 |
| JP | 2012001094 | 1/2012 |

OTHER PUBLICATIONS

Japanese Office Action for Japanese Application No. 2014198025, dated Apr. 28, 2016.

* cited by examiner

STARTER ARRANGEMENT

CROSS-REFERENCE TO RELATED APPLICATION

This application claims priority under 35 U.S.C. §119 to German Patent Application No. DE 10 2013 110 724.9, filed Sep. 27, 2013, which is incorporated by reference herein it is entirety.

FIELD OF THE INVENTION

The invention relates to a starter arrangement, with the aid of which a motor vehicle engine, in particular an internal combustion engine of a motor vehicle, can be started.

BACKGROUND OF THE INVENTION

U.S. Pat. No. 5,855,139, which is incorporated by reference herein, has disclosed connecting a starter unit for starting an internal combustion engine of a motor vehicle in direct thermally conducting contact to an inner side of a clutch housing via a starter ring which is connected to a drive shaft of the internal combustion engine. The starter unit has a starter shaft which protrudes out of a motor housing with a pinion, it being possible for the pinion to mesh with the starter ring which is attached to a flywheel. The motor housing is arranged radially outside with respect to a clutch which is arranged inside the clutch housing, the clutch being connected directly to the flywheel via axially running screws, in order to couple the drive shaft, connected to the flywheel, of the internal combustion engine to a transmission input shaft of a motor vehicle transmission which is connected to the clutch housing.

There is a constant need to reduce installation space requirements for positioning a drive train in a motor vehicle body.

SUMMARY OF THE INVENTION

It is an object of the invention to indicate measures which make a smaller installation space requirement possible for positioning a drive train in a motor vehicle body.

According to aspects of the invention, the object is achieved by way of a starter arrangement having a starter ring for connecting to a drive shaft of the motor vehicle engine, a starter unit for introducing a starter torque into the starter ring via a starter pinion which can act on the starter ring, and a clutch which is connected to the starter ring for coupling the drive shaft of the motor vehicle engine to at least one transmission input shaft of a motor vehicle transmission, the clutch being positioned spaced apart in the axial direction from the starter ring by an axial distance s, a reserved installation space for positioning an electric machine for the hybrid drive of the motor vehicle being formed by way of the axial distance s, the starter unit being positioned at least partially, preferably in large part, within the reserved installation space. Preferred refinements of the invention are specified in the subclaims which can represent an aspect of the invention in each case individually or in combination.

According to aspects of the invention, a starter arrangement for starting a motor vehicle engine of a motor vehicle is provided, having a starter ring for connecting to a drive shaft of the motor vehicle engine, a starter unit for introducing a starter torque into the starter ring via a starter pinion which can act on the starter ring, and a clutch which is connected to the starter ring for coupling the drive shaft of the motor vehicle engine to at least one transmission input shaft of a motor vehicle transmission, the clutch being positioned spaced apart in the axial direction from the starter ring by an axial distance s, a reserved installation space for positioning an electric machine for the hybrid drive of the motor vehicle being formed by way of the axial distance s, the starter unit being positioned at least partially, preferably in large part, within the reserved installation space.

In the case of a hybrid vehicle, an electric machine can be provided between the starter ring, which can be connected, in particular, to the drive shaft of the motor vehicle engine via a torsional vibration damper which is configured, for example, as a two-mass flywheel, and the clutch, which electric machine can be connected, in particular, selectively into the torque flow which runs between the drive shaft and the clutch. As a result, drive purely by engine, purely electric drive and/or both drive by engine and electric drive of the motor vehicle can be achieved. The electric machine can also be connected in generator operation, in order to convert mechanical energy into electrical energy which can be stored. To this end, the electric machine is positioned within the axial distance s between the starter ring and the clutch in the reserved installation space which is provided for this purpose. In the installed state of the electric machine, the reserved installation space can be filled completely by the electric machine.

If the same motor vehicle is to be configured not as a hybrid vehicle but rather as a conventional motor vehicle which can be driven only by engine, the electric machine can be dispensed with. Here, it can be appropriate for cost reasons to provide the same motor vehicle body and an otherwise in principle identical drive train for the hybrid vehicle and the conventional motor vehicle, with the result that a particularly large number of identical parts which can be manufactured inexpensively in mass production can be used both for the hybrid vehicle and for the conventional motor vehicle. This leads to the reserved installation space which is originally provided for the electric machine between the starter ring and the clutch to remain free with the axial extent s or a somewhat smaller extent in the conventional motor vehicle and for it therefore to be possible to be used for the positioning of the starter unit. Here, the finding is utilized that a starter unit can be omitted in a hybrid vehicle and that feed can be taken from the electric machine for starting the motor vehicle engine which is configured as an internal combustion engine and, in a conventional motor vehicle, the reserved installation space which has become free as a result of the omission of the electric machine which is provided for the hybrid vehicle can be utilized by the starter unit of smaller dimensions.

Since the reserved installation space which is free in the conventional motor vehicle can be shared at least partially by the starter unit, it is not necessary to provide the starter unit radially outside the reserved installation space or radially outside the clutch, with the result that at least the dimension of radially projecting bumps which might project into the footwell region of the driver or passenger for accommodating the starter unit can be reduced. As a result, it is possible to provide the starter unit not on the engine side but rather on the transmission side in relation to the starter ring, without it being necessary to provide additional installation space for the starter unit in the region of the motor vehicle transmission or the clutch. The radial installation space requirement of a drive train which has the starter arrangement can be kept low or even reduced as a result. A smaller installation space requirement, in particular in the radial direction, for positioning a drive train in a motor vehicle body is made possible by way of the sharing of the reserved installation space which is provided for the electric machine of a hybrid vehicle.

By way of the starter unit, in particular, an electrically generated starter torque can be introduced into the starter ring and from the starter ring by the drive shaft into the motor vehicle engine which is configured, in particular, as an internal combustion engine, in order to start the motor vehicle engine. The starter unit can have an electric motor, the electric motor of the starter unit being of considerably smaller dimensions in contrast with the electric machine of a hybrid vehicle, which electric machine is designed to drive the motor vehicle, and not being suitable, or being only very poorly suitable for propelling the motor vehicle. The starter unit can have a starter shaft which protrudes out of a motor housing with the pinion. The pinion can be engaged permanently in the starter ring or can be engaged into the starter ring only when required. The starter ring has, in particular, an external toothing system, with which the pinion of the starter unit can mesh. It is also possible that the starter ring has an internal toothing system, with the result that the pinion of the starter unit can engage radially from the inside into the starter ring, as a result of which the radial installation space requirement of the starter unit can be reduced further. The clutch is configured, in particular, as a double clutch for engaging a double clutch transmission. The clutch can be configured, for example, as a hydrodynamic torque converter or friction clutch, for example a dry or wet multiplate clutch.

In particular, a clutch housing which surrounds the starter ring and the clutch is provided, the starter unit being positioned radially within the clutch housing. As a result, the starter unit can be enclosed acoustically in the clutch housing, with the result that noise caused by the starter unit can be damped at least by the wall of the clutch housing.

The starter unit is preferably connected to the clutch housing in a manner which is spaced apart via a sealing frame. Direct contact of the starter unit with the clutch housing is avoided as a result, with the result that striking of the starter unit against the clutch housing and noise which is caused as a result, for example as a result of vibrations of the starter unit during operation, can be avoided. In particular, the sealing frame can have a flexible, in particular rubber-like material, with the result that the sealing frame can damp mechanical vibrations and/or sound waves.

The sealing frame particularly preferably encloses a cooling volume between the starter unit and the clutch housing, the cooling volume being connected to a surrounding area outside the clutch housing via at least one inlet opening which is provided in the clutch housing and at least one outlet opening which is provided in the clutch housing, the at least one inlet opening being provided, in particular, below the outlet opening in the direction of gravity. The cooling volume is connected via the inlet opening and the outlet opening exclusively only to a surrounding area which lies outside the clutch housing. There is no connection of the cooling volume to an additional volume which lies inside the clutch housing. As a result, sound waves which are generated inside the clutch housing cannot leave the clutch housing via the cooling volume. As a result, the cooling volume can be sufficiently acoustically insulated, with the result that no disruptive noise can exit from the clutch housing via the inlet opening and/or the outlet opening. At the same time, sufficient cooling of the starter unit can be achieved by way of convection, in particular natural convection, with the result that an impairment of the service life of the starter unit as a result of excessively high operating temperatures is avoided. In particular, the cooling which is achieved as a result can be sufficient for the drive train to provide start-stop operation.

In particular, a cooling air flow which enters via the inlet opening and exits via the outlet opening sweeps over an outer side of the starter unit over an angular range $\alpha$, wherein, in particular, $45°\leq\alpha\leq240°$, preferably $60°\leq\alpha\leq180°$, further preferably $90°\leq\alpha\leq160°$ and particularly preferably $120°\leq\alpha\leq150°$. As a result, regions are avoided, in which the cooling air flow accumulates and heats up, whereas at the same time particularly great heat dissipation by way of natural convection can be achieved.

The sealing frame preferably has a holding clasp which is, in particular, metallic for receiving the starter unit in a clamping manner, the holding clasp being provided at least on an inner side which points toward the starter unit and an outer side which points toward the clutch housing with an elastic sealing material which is preferably vulcanized or adhesively bonded on, in particular for acoustic insulation. By way of the holding clasp, the starter unit can be received reliably and can be connected to the clutch housing via the sealing frame. The elastic sealing material can preferably have a noise-absorbing and acoustically insulating behavior, with the result that it is prevented that noise which is produced inside the clutch housing can penetrate in an unimpeded manner to the outside. The elastic sealing material bears against the starter unit and the inner side of the clutch housing, in particular, in a gap-free manner.

The sealing frame particularly preferably has at least one inner sealing lip which points toward the starter unit and/or at least one outer sealing lip which points toward the clutch housing, the inner sealing lip, in particular, bearing against the starter unit in a substantially gap-free manner and/or the outer sealing lip bearing against the clutch housing in a substantially gap-free manner, the inner sealing lip and/or the outer sealing lip preferably being manufactured from a noise-insulating material. Positional and spacing tolerances which exist between the starter unit and the clutch housing can be compensated for by way of the respective sealing lip. Furthermore, the elastic sealing material can more easily bear against the starter unit and the inner side of the clutch housing in a gap-free manner and prevent an escape of noise as a result.

In particular, the sealing frame is formed conically radially on the inside and/or radially on the outside in the axial direction in order to compensate for a mold-release slope of the clutch housing. The clutch housing can be manufactured, in particular, inexpensively by way of aluminum casting. The mold-release slopes which are produced in this forming process can be compensated for by the conical shaped-out molding of the sealing frame which runs, in particular, along the rotational axis of the pinion. As a result, full-area and particularly noise-insulating contact of the sealing frame with the starter unit and/or with the clutch housing can be ensured, without it being necessary for this purpose to previously machine the clutch housing, in particular the inner side of the clutch housing, for example by way of milling. As a result, the manufacturing costs can be kept low.

The sealing frame preferably has an anti-rotation safeguard for the positively locking or frictionally locking connection to the starter unit and/or to the clutch housing. The relative position of the sealing frame with respect to the starter unit and/or with respect to the clutch housing can be predetermined in a defined manner by way of the anti-rotation safeguard, with the result that the correct position of the sealing frame is ensured during mounting of the starter unit in the clutch housing. The anti-rotation safeguard is, in particular, substantially inflexible and is preferably not provided with an elastic sealing material, with the result that the positional accuracy of the starter unit in the sealing frame, in particular in the circumferential direction, is not reduced by inherent elasticities of the anti-rotation safeguard. The anti-rotation safeguard can be configured, for example, as a protruding metallic shoulder, it being possible for the shoulder to be inserted in a positively locking manner into a corresponding cutout and/or to be clamped in a frictionally locking manner by way of a fastening means, for example a screw. The sealing frame is preferably pre-assembled on the starter unit, and the starter unit is subsequently screwed with the sealing frame into the clutch housing.

The starter unit particularly preferably has a switching unit, in particular a solenoid switch, for actuating a starter motor of the starter unit, the switching unit being provided inside the clutch housing. The reserved installation space which is provided originally for the electric machine between the starter ring and the clutch, in particular with the axial extent s, is also large enough to receive the starter unit or further components of the starter unit, with the result that it is not necessary to guide said components of the starter unit through the clutch housing. As a result, the radial installation space requirements can be kept low and apertures in the clutch housing, via which noise can leave the clutch housing to the outside, can be avoided.

In particular, the starter unit can be inserted into the clutch housing for mounting by way of a movement in the axial direction, the starter unit being fastened, in particular, to the clutch housing, in particular by way of screwing, via fastening means which run substantially axially parallel to a rotational axis of the starter pinion. An opening which is provided in the clutch housing for the lateral insertion of the starter unit with a movement component in the radial direction can be avoided as a result. Instead, the starter unit can be inserted via an axial opening which is provided in any case and via which, for example, the electric machine or the clutch can be inserted. Unnecessary openings in the clutch housing, via which noise can penetrate to the outside, can be avoided as a result.

The starter unit preferably has a fastening flange which protrudes in the radial direction from a motor housing of the starter unit for fastening to the clutch housing, the fastening flange bearing against the clutch housing by way of a bearing face which points away from the starter pinion. As a result, the starter unit can be inserted on the engine side into the clutch housing, with the result that it is not necessary to insert the starter unit on the transmission side. In particular, the starter ring is mounted after mounting of the starter unit, with the result that the starter unit can be fastened in a virtually captive manner in the clutch housing.

BRIEF DESCRIPTION OF THE DRAWINGS

In the following text, the invention will be explained by way of example with reference to the appended drawings using preferred exemplary embodiments, it being possible for the features which are shown in the following text to represent an aspect of the invention both in each case individually and in combination. In the drawings.

DETAILED DESCRIPTION OF THE INVENTION

Figure 1:
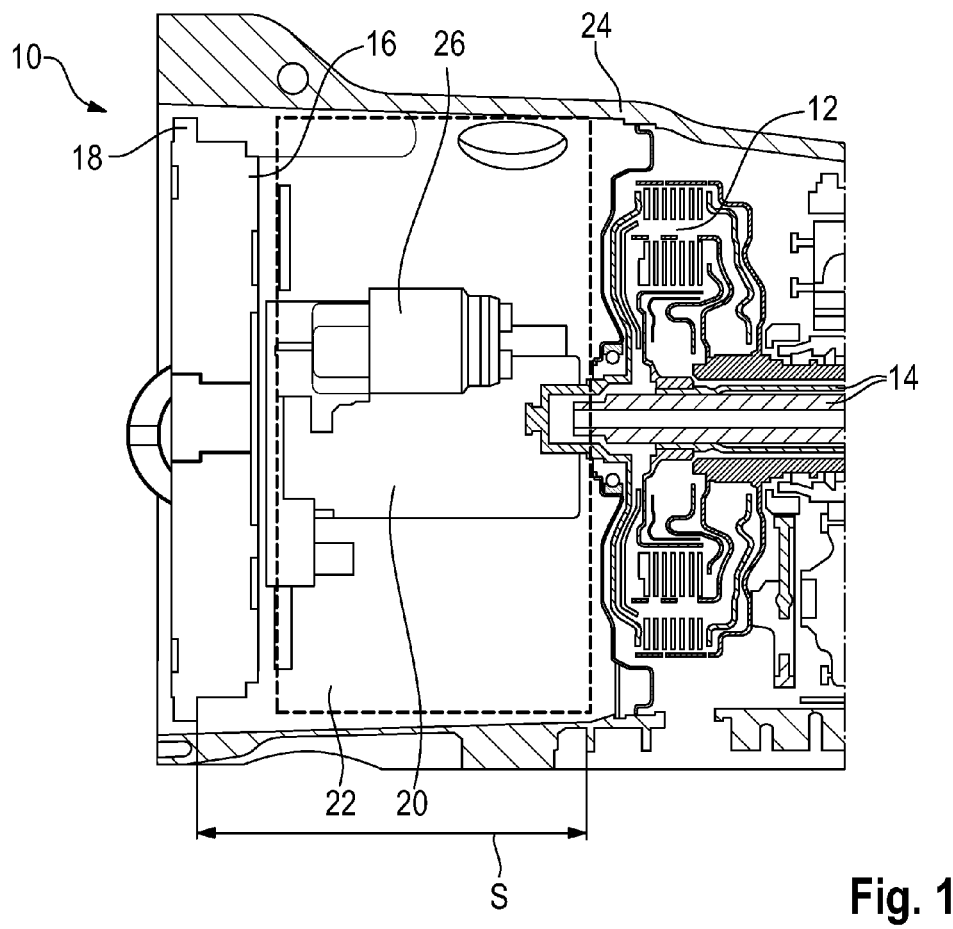
FIG. 1 shows a diagrammatic sectional side view of a starter arrangement.
Figure 2:
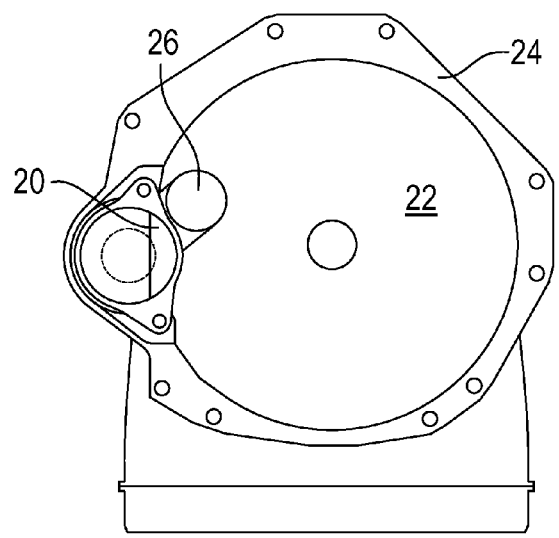
FIG. 2 shows a diagrammatic plan view of the starter arrangement from FIG. 1.

The starter arrangement 10 (shown in FIG. 1 and FIG. 2) of a conventional motor vehicle has a clutch 12 which is configured as a double clutch, with the aid of which a transmission input shaft 14 can be coupled to a drive shaft of a motor vehicle engine which is configured as an internal combustion engine. To this end, said drive shaft can be connected first of all to a torsional vibration damper 16 which is configured as a two-mass flywheel. The torsional vibration damper 16 has a starter ring 18, via which an electrically generated torque can be introduced into the drive shaft with the aid of a starter unit 20, in order to start the motor vehicle engine. The starter ring 18 is spaced apart from the clutch 12 by an axial distance s which is large enough to provide an electric machine of a hybrid drive in a reserved installation space 22 which is formed as a result between the torsional vibration damper 16 and the clutch 12, the electric machine being dimensioned for purely electric drive of the motor vehicle. In the exemplary embodiment which is shown, the starter ring 18 is provided on an input side of the torsional vibration damper 16, with the result that part of the torsional vibration damper 16 is arranged within the axial distance s and the axial extent of the reserved installation space 22 is somewhat smaller than the axial extent s between the starter ring 18 and the clutch 12. The reserved installation space 22 is delimited in the axial direction on one side by the torsional vibration damper 16 and on the other side by the clutch 12. In the radial direction, the reserved installation space 22 is delimited by a clutch housing 24 which engages radially around the outside of the clutch 12 and the torsional vibration damper 16. The starter unit 20 is positioned for a large part in the reserved installation space 22 and can protrude at least partially into a region radially to the inside, which region would have been taken up by the electric machine inserted in the reserved installation space 22 in a hybrid motor vehicle.

Figure 3:
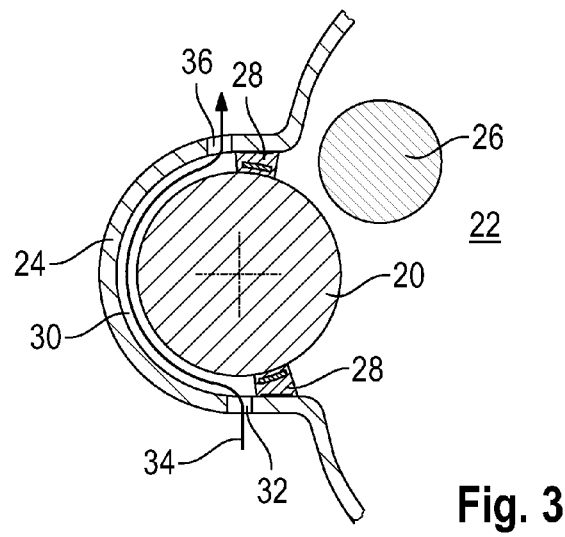
FIG. 3 shows a diagrammatic sectional plan view of a detail of the starter arrangement from FIG. 1.

As shown in FIG. 3, a switching unit 26, configured as a solenoid switch, of the starter unit 22 can protrude radially to the inside into the reserved installation space 22, in particular. The starter unit 22 is inserted with the aid of an elastically configured sealing frame 28 into a region of the reserved installation space 22, which region is shaped by the clutch housing 24 and is of correspondingly bulged shape. A cooling volume 30 which is enclosed by the sealing frame 28 is separated between the inserted starter unit 20 and the clutch housing 24. Via at least one lower (in the vertical direction) inlet opening 32 which is provided in the clutch housing 24, a cooling air flow 34 can enter and can flow along the starter unit 20 over an angular range of approximately 180°, in order to cool the starter unit 20. The heated cooling air flow 34 can leave the cooling volume 30 by way of natural convection via at least one upper (in the vertical direction) outlet opening 36 which is provided in the clutch housing 24.

Figure 4:
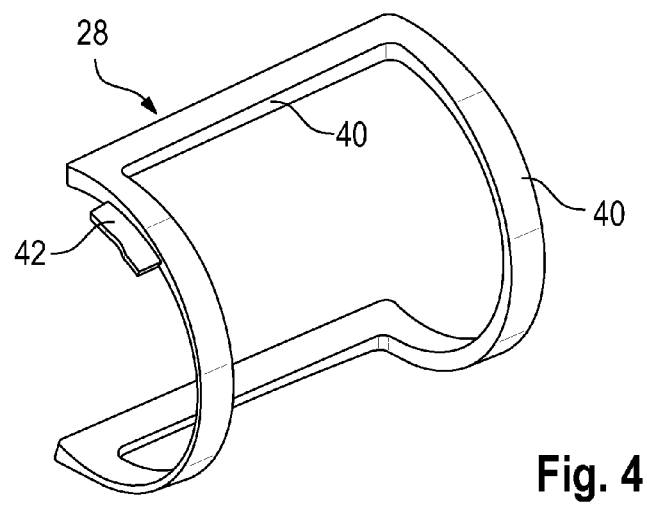
FIG. 4 shows a diagrammatic perspective view of a sealing frame of the starter arrangement from FIG. 1.
Figure 5:
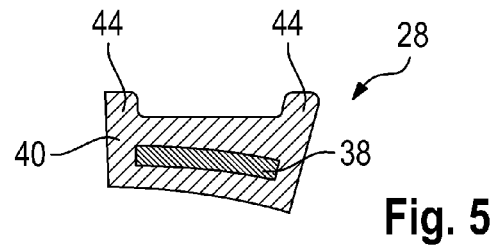
FIG. 5 shows a diagrammatic sectional view of the sealing frame from FIG. 4.

As shown in FIG. 4 and FIG. 5, the sealing frame 28 can have a metallic holding clasp 38 as core, which holding clasp 38 is encapsulated with an elastic and noise-insulating sealing material 40. An anti-rotation safeguard 42 which is configured as a substantially inflexible shoulder and is configured in one piece with the holding clasp 38 protrudes out of the sealing material 40. In the exemplary embodiment which is shown, furthermore, the sealing frame 28 has outer sealing lips 44 which point toward the clutch housing 24, in order to compensate for positional and spacing tolerances of the starter unit 20 with respect to the clutch housing 24 in the installed state and to ensure gap-free bearing of the sealing frame 28 against the starter unit 20 and the clutch housing 24, as a result of which sufficient sealing of the cooling volume 30 with respect to the interior of the clutch housing 24 is achieved.

What is claimed is:

1. A starter arrangement for starting a motor vehicle engine of a motor vehicle, comprising:
   a starter ring for connecting to a drive shaft of the motor vehicle engine,
   a starter unit for introducing a starter torque into the starter ring via a starter pinion which can act on the starter ring,
   a clutch which is connected to the starter ring for coupling the drive shaft of the motor vehicle engine to at least one transmission input shaft of a motor vehicle transmission, the clutch being positioned spaced apart in the axial direction from the starter ring by an axial distance s, a reserved installation space for positioning an electric machine for the hybrid drive of the motor vehicle being formed by way of the axial distance s, the starter unit being positioned at least partially within the reserved installation space, and
   a clutch housing surrounding the starter ring and the clutch, the starter unit being positioned radially within the clutch housing, wherein the starter unit is connected to the clutch housing in a manner which is spaced apart via a sealing frame, and wherein the sealing frame encloses a cooling volume between the starter unit and the clutch housing, the cooling volume being connected to a surrounding area outside the clutch housing via at least one inlet opening in the clutch housing and at least one outlet opening in the clutch housing, the at least one inlet opening disposed below the outlet opening in the direction of gravity.

2. The starter arrangement as claimed in claim 1, wherein a cooling air flow which enters via the inlet opening and exits via the outlet opening sweeps over an outer side of the starter unit over an angular range α, wherein 45°≤α≤240°.

3. The starter arrangement as claimed in claim 2, wherein 60° a 180°.

4. The starter arrangement as claimed in claim 2, wherein 90° a 160°.

5. The starter arrangement as claimed in claim 2, wherein 120° a 150°.

6. The starter arrangement as claimed in claim 1, wherein the sealing frame has a holding clasp for receiving the starter unit in a clamping manner, the holding clasp being provided at least on an inner side which points toward the starter unit and an outer side which points toward the clutch housing with an elastic sealing material.

7. The starter arrangement as claimed in claim 6, wherein the elastic sealing material is vulcanized or adhesively bonded to the outer side of the holding clasp.

8. The starter arrangement as claimed in claim 6, wherein the holding clasp is metallic.

9. The starter arrangement as claimed in claim 1, wherein the sealing frame has at least one inner sealing lip which points toward the starter unit and/or at least one outer sealing lip which points toward the clutch housing, the inner sealing lip bearing against the starter unit in a substantially gap-free manner and/or the outer sealing lip bearing against the clutch housing in a substantially gap-free manner.

10. The starter arrangement as claimed in claim 9, wherein the inner sealing lip and/or the outer sealing lip comprise a noise insulating material.

11. The starter arrangement as claimed in claim 1, wherein the sealing frame is formed conically radially on the inside and/or radially on the outside in the axial direction in order to compensate for a mold-release slope of the clutch housing.

12. The starter arrangement as claimed in claim 1, wherein the sealing frame has an anti-rotation safeguard for the positively locking or frictionally locking connection to the starter unit and/or to the clutch housing.

13. The starter arrangement as claimed in claim 1, wherein the starter unit has a switching unit for actuating a starter motor of the starter unit, the switching unit being provided inside the clutch housing.

14. The starter arrangement as claimed in claim 1, wherein the starter unit can be inserted into the clutch housing for mounting by way of a movement in the axial direction, the starter unit being fastened to the clutch housing by way of screwing, via fastening means which run substantially axially parallel to a rotational axis of the starter pinion.

15. The starter arrangement as claimed in claim 1, wherein the starter unit has a fastening flange which protrudes in the radial direction from a motor housing of the starter unit for fastening to the clutch housing, the fastening flange bearing against the clutch housing by way of a bearing face which points away from the starter pinion.

16. The starter arrangement as claimed in claim 14, wherein the fastening means comprise one or more screws.

* * * * *